(12) United States Patent
Radivojevic et al.

(10) Patent No.: US 9,195,350 B2
(45) Date of Patent: Nov. 24, 2015

(54) APPARATUS AND ASSOCIATED METHODS

(75) Inventors: Zoran Radivojevic, Cambridge (GB); Paul Beecher, Cambridge (GB); Chris Bower, Ely (GB); Piers Andrew, Cambridge (GB); Darryl Cotton, St. Ives (GB); Samiul Haque, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 712 days.

(21) Appl. No.: 13/281,776

(22) Filed: Oct. 26, 2011

(65) Prior Publication Data

US 2013/0106758 A1    May 2, 2013

(51) Int. Cl.
G06F 3/045    (2006.01)
G06F 3/041    (2006.01)
G06F 3/044    (2006.01)

(52) U.S. Cl.
CPC ..................................... *G06F 3/044* (2013.01)

(58) Field of Classification Search
CPC . G09G 3/3659; G09G 3/3607; G09G 3/2077; G06F 3/044; G06F 3/041; G06F 3/033
See application file for complete search history.

(56) References Cited

U.S. PATENT DOCUMENTS

| 5,457,289 A | 10/1995 | Huang et al. |
| 5,543,588 A | 8/1996 | Bisset et al. |
| 2004/0155871 A1 | 8/2004 | Perski et al. |
| 2007/0171211 A1* | 7/2007 | Perski et al. ................ 345/173 |
| 2007/0222762 A1* | 9/2007 | Van Delden et al. ......... 345/173 |
| 2008/0158178 A1 | 7/2008 | Hotelling et al. |
| 2010/0013791 A1 | 1/2010 | Haga et al. |
| 2010/0085169 A1* | 4/2010 | Poupyrev et al. .......... 340/407.2 |
| 2010/0152794 A1 | 6/2010 | Radivojevic et al. ............ 607/2 |
| 2010/0156795 A1* | 6/2010 | Kim et al. ...................... 345/168 |
| 2010/0200309 A1 | 8/2010 | Yilmaz et al. |
| 2010/0201650 A1* | 8/2010 | Son ................................ 345/174 |
| 2010/0252335 A1 | 10/2010 | Orsley |
| 2010/0259503 A1 | 10/2010 | Yanase et al. |

(Continued)

FOREIGN PATENT DOCUMENTS

| EP | 2112576 A1 | 10/2009 |
| EP | 2354901 A1 | 8/2011 |

(Continued)

OTHER PUBLICATIONS

Reverter, et al., "Stability and Accuracy of Active Shielding for Grounded Capacitive Sensors", Institute of Physics Publishing, (Sep. 28, 2006), (pp. 2884-2890).

(Continued)

*Primary Examiner* — Mark Regn
(74) *Attorney, Agent, or Firm* — Harrington & Smith

(57) ABSTRACT

An apparatus including a first sensor configured to couple capacitively to a stylus when said stylus is in proximity to the first sensor, capacitive coupling between the first sensor and the stylus configured to generate a first touch input signal to enable detection of a first touch input; and a layer configured to couple capacitively to the stylus when said stylus is in proximity to the layer, capacitive coupling between the layer and the stylus configured to provide haptic feedback, wherein the layer is positioned adjacent the first sensor, the positioning resulting in capacitive cross-coupling between the first sensor and the layer, and wherein the layer includes a first aperture configured to reduce the capacitive cross-coupling.

18 Claims, 11 Drawing Sheets

(56) References Cited

U.S. PATENT DOCUMENTS

| | | |
|---|---|---|
| 2010/0302182 A1 | 12/2010 | Wei et al. |
| 2010/0309162 A1 | 12/2010 | Nakanishi et al. |
| 2010/0321328 A1 | 12/2010 | Chang et al. .................. 345/174 |
| 2011/0074609 A1 | 3/2011 | Lin |
| 2011/0074733 A1 | 3/2011 | Mäkinen et al. |
| 2011/0148435 A1 | 6/2011 | Schwartz et al. |
| 2011/0156930 A1 | 6/2011 | Chen et al. |
| 2011/0254799 A1 | 10/2011 | Makinen et al. |
| 2012/0075221 A1 | 3/2012 | Yasuda |
| 2012/0194466 A1 | 8/2012 | Posamentier |

FOREIGN PATENT DOCUMENTS

| | | |
|---|---|---|
| EP | 2482164 A1 | 8/2012 |
| GB | 2462112 A | 1/2010 |
| GB | 2478765 A | 9/2011 |
| WO | WO-2009056784 A1 | 5/2009 |

OTHER PUBLICATIONS

AD7142, "Theory of Operation", (2007), (5 pages).
AD7147, Analog Services, "CapTouch Programmable Controller for Single-Electrode Capacitance Sensors", (2007), (72 pages).

* cited by examiner

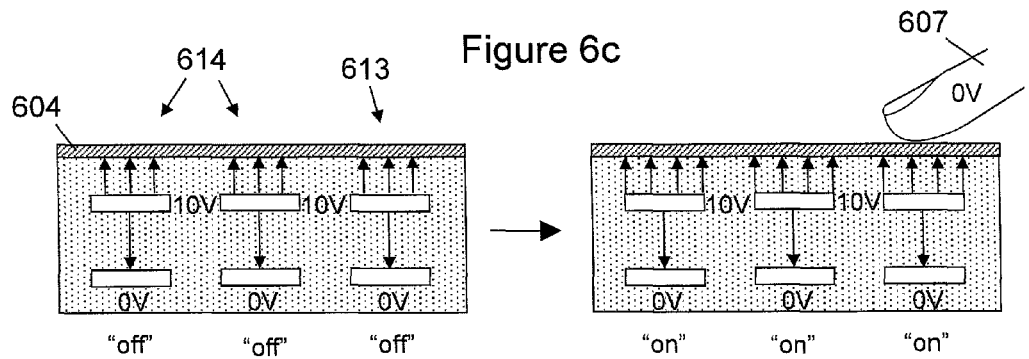
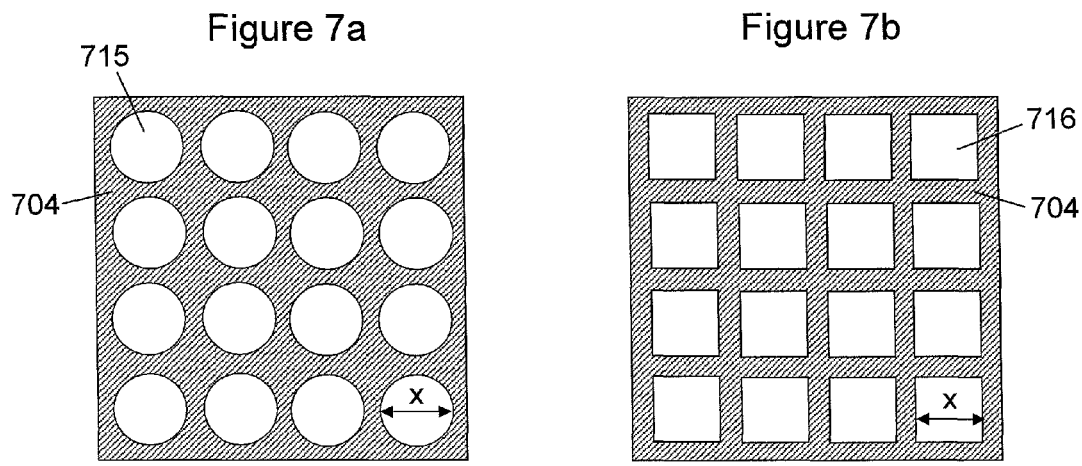
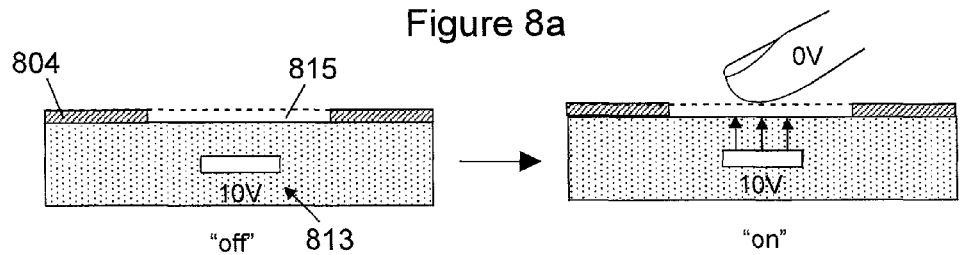

APPARATUS AND ASSOCIATED METHODS

TECHNICAL FIELD

The present disclosure relates to the field of touchscreen displays associated methods and apparatus, and in particular concerns an electrotactile stimulation system which is compatible with capacitive touch technology. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

In touch user interfaces, a capacitive sensing matrix for touch detection is gaining greater adherence than traditional resistive touchscreen solutions. Neither technology, however, incorporates haptic feedback. There are several emerging technologies aiming to introduce haptic feedback without mechanically moving parts. One of these is an electrotactile surface which takes advantage of capacitive coupling to the user's skin to create a variable frictional force on the touchscreen panel. However, combining capacitive sensing and haptic feedback is a technical challenge which needs an intelligent and dedicated architecture to function properly.

The apparatus and methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising:
a first sensor configured to couple capacitively to a stylus when said stylus is in proximity to the first sensor, capacitive coupling between the first sensor and the stylus configured to generate a first touch input signal to enable detection of a first touch input; and
a layer configured to couple capacitively to the stylus when said stylus is in proximity to the layer, capacitive coupling between the layer and the stylus configured to provide haptic feedback,
wherein the layer is positioned adjacent the first sensor, the positioning resulting in capacitive cross-coupling between the first sensor and the layer, and
wherein the layer comprises one or more apertures configured to reduce the capacitive cross-coupling.

In specific embodiments, the terms "sensor" and "layer" may be interpreted as "capacitive touch sensor" and "electrotactile layer". Furthermore, the term "sensor" may be taken to mean a single node of a capacitive sensor array, and the term "layer" may be taken to mean the conductive electrode of an electrotactile system.

The term "stylus" may be taken to mean any object which is capable of holding electrical charge and which can be used to provide a touch input. The stylus may be made from an electrically conductive material or a dielectric material. The stylus may be a user of the apparatus (e.g. a user's finger), a conventional input stylus (e.g. a stylus as used with PDAs and the like), or a glove worn by a user of the apparatus (e.g. a glove comprising fingertips configured to hold electrical charge).

The dimensions, positioning and/or shape of the one or more apertures may be chosen to reduce the capacitive cross-coupling. The dimensions, positioning and/or shape of the one or more apertures may be chosen such that the material used to form the layer does not completely overlap with (i.e. located directly above or below) the first sensor. The material used to form the layer may partially overlap with the first sensor (e.g. covers up to 10%, 25% or 50% of the area of the sensor), or it may not overlap with the first sensor at all. The dimensions, positioning and/or shape of the one or more apertures may be chosen such that the capacitive cross-coupling is insufficient to prevent detection of the first touch input when the stylus is in proximity to the first sensor. The dimensions, positioning and/or shape of the one or more apertures may be chosen such that the layer is able to couple capacitively to the stylus when said stylus is positioned to provide a touch input to the first sensor.

The apparatus may comprise a second sensor. The second sensor may be configured to couple capacitively to the stylus when said stylus is in proximity to the second sensor. Capacitive coupling between the second sensor and the stylus may be configured to generate a second touch input signal to enable detection of a second touch input. The layer may be positioned adjacent the second sensor. The positioning may result in capacitive cross-coupling between the second sensor and the layer. The one or more apertures may be configured to reduce the capacitive cross-coupling between the second sensor and the layer.

The dimensions, positioning and/or shape of the one or more apertures may be chosen such that the capacitive cross-coupling between the first and second sensors and the layer is insufficient to cause the unintentional generation of a second touch input signal when the stylus couples capacitively to the first sensor.

Capacitive coupling between the first sensor and the stylus may vary the capacitance of the first sensor. The dimensions, positioning and/or shape of the one or more apertures may be chosen such that the capacitive cross-coupling causes a negligible variation in the capacitance of the first sensor.

The first sensor may comprise an electrode. The stylus may form a capacitor with the electrode when the stylus is in proximity to the first sensor. Capacitive coupling between the first sensor and the stylus may cause a variation (increase or decrease depending on the stylus material) in the capacitance of the electrode. The variation in capacitance may be between 1 fF and 2 pF.

The first sensor may comprise transmitter and receiver electrodes configured to generate an electric field therebetween. The stylus may interfere with the electric field when the stylus is in proximity to the first sensor. Capacitive coupling between the first sensor and the stylus may cause a variation (increase or decrease depending on the stylus material) in the capacitance of the receiver electrode. The variation in capacitance may be between 1 fF and 2 pF.

The first sensor may be a capacitive touch sensor. The first sensor may be a self-capacitive touch sensor. The first sensor may be a mutually-capacitive touch sensor. The mutually-capacitive touch sensor may be a horizontally or vertically-arranged mutually-capacitive touch sensor.

The layer may comprise one or more of a metal and a semiconductor. The metal may comprise one or more of gold, silver and copper. The semiconductor may comprise one or more of indium tin oxide and vanadium oxide. The layer may be formed as one or more of a thin film and a network of nanowires (e.g. silver, carbon, zinc oxide)/graphene nano-ribbons or graphene nanowires. At least one of the one or more apertures may have a circular, elliptical, square, diamond or trapezoidal shape.

The layer may be an electrotactile layer. The electrotactile layer may be positioned on top of the first sensor. The electrotactile layer may be located between upper and lower layers of electrically insulating material. The first sensor and the electrotactile layer may be separated by the lower layer of electrically insulating material.

The apparatus may comprise a plurality of sensors. Each sensor may be configured to couple capacitively to the stylus when said stylus is in proximity to the sensor. Capacitive coupling between each sensor and the stylus may be configured to generate a respective touch input signal to enable detection of a respective touch input. The layer may be positioned adjacent the plurality of sensors. The positioning may result in capacitive cross-coupling between each sensor and the layer. The one or more apertures may be configured to reduce the capacitive cross-coupling between each sensor and the layer.

The layer may comprise a plurality of apertures. Each aperture may be configured to reduce the capacitive cross-coupling between one sensor and the layer. Each aperture may be configured to reduce the capacitive cross-coupling between multiple sensors and the layer.

According to a further aspect, there is provided a device comprising any apparatus described herein. The device may be at least one of the following: an electronic device, a portable electronic device, a portable telecommunications device, a touchscreen display for any of the aforementioned devices, and a module for any of the aforementioned devices.

According to a further aspect, there is provided an apparatus comprising:
   means for detecting a touch input, the means for detecting a touch input configured to couple capacitively to a stylus when said stylus is in proximity to the means for detecting a touch input, capacitive coupling between the means for detecting a touch input and the stylus configured to generate a first touch input signal to enable detection of a first touch input,
   means for providing haptic feedback configured to couple capacitively to the stylus when said stylus is in proximity to the means for providing haptic feedback, capacitive coupling between the means for providing haptic feedback and the stylus configured to provide haptic feedback,
   wherein the means for providing haptic feedback is positioned adjacent the means for detecting a touch input, the positioning resulting in capacitive cross-coupling between the means for detecting a touch input and the means for providing haptic feedback, and
   wherein the means for providing haptic feedback comprises one or more apertures configured to reduce the capacitive cross-coupling.

According to a further aspect, there is provided a layer for a device,
   the device comprising a first sensor configured to couple capacitively to a stylus when said stylus is in proximity to the first sensor, capacitive coupling between the first sensor and the stylus configured to generate a first touch input signal to enable detection of a first touch input,
   the layer configured to couple capacitively to the stylus when said stylus is in proximity to the layer, capacitive coupling between the layer and the stylus configured to provide haptic feedback,
   wherein the layer, when fitted to the device, is positioned adjacent the first sensor, the positioning resulting in capacitive cross-coupling between the first sensor and the layer, and
   wherein the layer comprises one or more apertures configured to reduce the capacitive cross-coupling.

According to a further aspect, there is provided a method comprising:
   providing a first sensor configured to couple capacitively to a stylus when said stylus is in proximity to the first sensor, capacitive coupling between the first sensor and the stylus configured to generate a first touch input signal to enable detection of a first touch input;
   providing a layer configured to couple capacitively to the stylus when said stylus is in proximity to the layer, capacitive coupling between the layer and the stylus configured to provide haptic feedback, wherein the layer is positioned adjacent the first sensor, the positioning resulting in capacitive cross-coupling between the first sensor and the layer; and
   providing one or more apertures in the layer, the one or more apertures configured to reduce the capacitive cross-coupling.

According to a further aspect, there is provided a method comprising:
   providing a layer for a device, the device comprising a first sensor configured to couple capacitively to a stylus when said stylus is in proximity to the first sensor, capacitive coupling between the first sensor and the stylus configured to generate a first touch input signal to enable detection of a first touch input, the layer configured to couple capacitively to the stylus when said stylus is in proximity to the layer, capacitive coupling between the layer and the stylus configured to provide haptic feedback, wherein the layer, when fitted to the device, is positioned adjacent the first sensor, the positioning resulting in capacitive cross-coupling between the first sensor and the layer; and
   forming one or more apertures in the layer, the one or more apertures configured to reduce the capacitive cross-coupling.

According to a further aspect, there is provided a method comprising:
   detecting a first touch input using an apparatus, the apparatus comprising a first sensor configured to couple capacitively to a stylus when said stylus is in proximity to the first sensor, capacitive coupling between the first sensor and the stylus configured to generate a first touch input signal to enable detection of a first touch input, and a layer configured to couple capacitively to the stylus when said stylus is in proximity to the layer, capacitive coupling between the layer and the stylus configured to provide haptic feedback, wherein the layer is positioned adjacent the first sensor, the positioning resulting in capacitive cross-coupling between the first sensor and the layer, and wherein the layer comprises one or more apertures configured to reduce the capacitive cross-coupling.

According to a further aspect, there is provided an apparatus comprising:
- a capacitive touch sensor configured to detect a touch input from a stylus when said stylus is in proximity to the capacitive touch sensor; and
- an electrotactile layer configured to provide haptic feedback to a stylus when said stylus is in proximity to the electrotactile layer,
- wherein the capacitive touch sensor is configured to detect a touch input when the sensor is in an on state but not in an off state, and the electrotactile layer is configured to provide haptic feedback when the electrotactile layer is in an on state but not in an off state, and
- wherein the apparatus is configured to place the capacitive touch sensor or electrotactile layer in the on state to provide for the respective touch input detection or haptic feedback only when the other of the electrotactile layer or capacitive touch sensor is in the off state.

The apparatus may be configured to alternate the states of the capacitive touch sensor and electrotactile layer periodically. The apparatus may be configured to control the states of the capacitive touch sensor and electrotactile layer using a plurality of switches.

This further aspect may be used in conjunction with the aforementioned aperture aspects.

The capacitive touch sensor may be configured to couple capacitively to the stylus when said stylus is in proximity to the sensor. Capacitive coupling between the sensor and the stylus may be configured to generate a touch input signal to enable detection of the touch input. The electrotactile layer may be configured to couple capacitively to the stylus when said stylus is in proximity to the electrotactile layer. Capacitive coupling between the electrotactile layer and the stylus may be configured to provide the haptic feedback. The electrotactile layer may be positioned adjacent the capacitive touch sensor. The positioning may result in capacitive cross-coupling between the sensor and the electrotactile layer. The electrotactile layer may comprise one or more apertures configured to reduce the capacitive cross-coupling.

According to a further aspect, there is provided a method comprising:
- providing for control/use of a capacitive touch sensor of an apparatus to be in the on state and an electrotactile layer of an apparatus to be in the off state to enable detection of a touch input using the capacitive touch sensor,
- the apparatus comprising the capacitive touch sensor and the electrotactile layer, the capacitive touch sensor configured to detect a touch input from a stylus when said stylus is in proximity to the capacitive touch sensor, the electrotactile layer configured to provide haptic feedback to a stylus when said stylus is in proximity to the electrotactile layer, wherein the capacitive touch sensor is configured to detect a touch input when the sensor is in an on state but not in an off state, and the electrotactile layer is configured to provide haptic feedback when the electrotactile layer is in an on state but not in an off state, and wherein the apparatus is configured to place the capacitive touch sensor or electrotactile layer in the on state to provide for the respective touch input detection or haptic feedback only when the other of the electrotactile layer or capacitive touch sensor is in the off state.

The method may comprise providing haptic feedback to a user of the apparatus in response to the detected first touch input.

The steps of any method disclosed herein do not have to be performed in the exact order disclosed, unless explicitly stated or understood by the skilled person.

According to a further aspect, there is provided a computer program, recorded on a carrier, the computer program comprising computer code configured to perform any method described herein.

The apparatus may comprise a processor configured to process the code of the computer program. The processor may be a microprocessor, including an Application Specific Integrated Circuit (ASIC).

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described example embodiments.

The above summary is intended to be merely exemplary and non-limiting.

BRIEF DESCRIPTION OF THE FIGURES

A description is now given, by way of example only, with reference to the accompanying drawings, in which:

FIG. 6c shows how an electrotactile layer can cause accidental triggering of vertically-arranged mutually-capacitive touch sensors;

FIG. 7a shows an electrotactile layer comprising a plurality of circular apertures;

FIG. 7b shows an electrotactile layer comprising a plurality of square apertures;

FIG. 8a shows how an aperture in an electrotactile layer can facilitate detection of a touch input by a horizontally-arranged self-capacitive touch sensor;

DESCRIPTION OF SPECIFIC ASPECTS/EMBODIMENTS

Haptic technology is a tactile feedback technology which takes advantage of a user's sense of touch by applying forces, vibrations, and/or motions upon the user to convey information. In the past, tactile feedback has been used to assist in the creation and control of virtual objects (i.e. objects existing only in a computer simulation), and to enhance control of remote machines and devices.

More recently, however, haptic technology has been used in portable electronic devices to supplement visual content. For example, some devices use haptic technology to produce vibrations in response to touch. This may be combined with touch-sensitive screens, where the vibrations can be used to acknowledge selection of on-screen content by the user. In other devices, vibrations have been used to direct a user to a particular on-screen feature, and even to create a tactile representation of an image to enable perception of displayed content with reduced cognitive effort.

Human skin uses four different mechanical receptors (mechanoreceptors) to detect pressure, vibrations and texture. These include the Meissner corpuscle, the Merkel disc, the Pacinian corpuscle, and the Ruffini ending. Known haptic devices typically stimulate these receptors using one or more of the following: pneumatic stimulation (jets of pressurised air), vibro-tactile stimulation (vibrating actuators), electrotactile stimulation (electric fields), and functional neuromuscular stimulation (electric currents).

The perception of surface texture is mediated by vibrations in the skin, which are encoded by Merkel discs, Meissner corpuscles and Pacinian corpuscles. In general, different textures give rise to different frequencies of vibration. Pacinian corpuscles can detect vibrations with frequencies of between 70 and 1000 Hz, but are especially susceptible to vibrations in the 200-400 Hz range (corresponding to the frequencies generated upon a finger tip by textures comprising features smaller than 200 µm when the finger is moved at a speed of 0.1 m/s). On the other hand, Meissner corpuscles have a higher sensitivity when sensing vibrations with a frequency of 10-50 Hz (corresponding to features of between 2 and 10 mm in size at a finger speed of 0.1 m/s). Similarly, Merkel discs can detect vibrational frequencies of 5-15 Hz (corresponding to a lengthscale of around 6-20 mm).

Figure 1A:
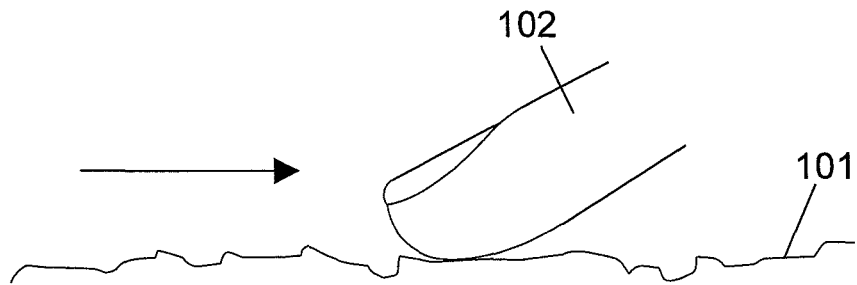
FIG. 1a shows a surface with an arbitrary roughness.

FIG. 1a illustrates schematically a textured surface 101 with an arbitrary roughness. When a finger 102 sweeps over the textured surface 101, the roughness of the surface causes vibrations in the skin which are detected by the mechanoreceptors. When the surface 101 has an arbitrary roughness, the vibrations have a wide range of frequencies. As discussed above, the Merkel disc is most sensitive to frequencies in the 5-15 Hz range, the Meissner corpuscle is most sensitive to frequencies in the 10-50 Hz range, and the Pacinian corpuscle is most sensitive to frequencies in the 200-400 Hz range. As a result, vibrational frequencies within these ranges are more strongly (i.e. mainly) detected than other vibrational frequencies.

Figure 1B:
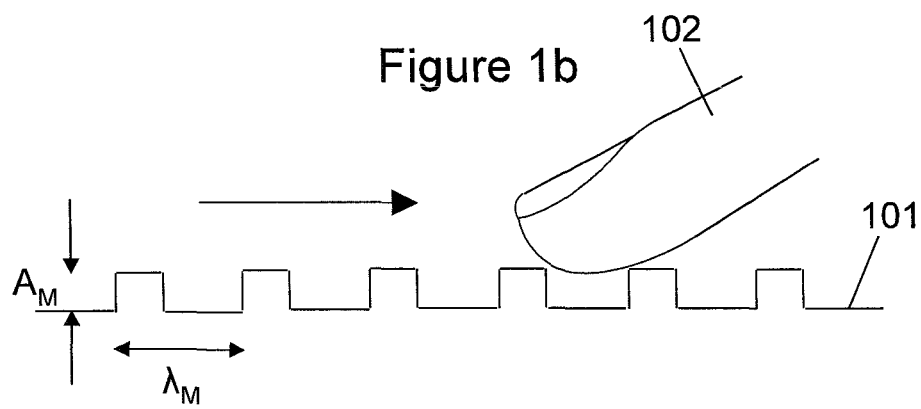
FIG. 1b shows a surface with a roughness which has been tuned for detection by the Meissner corpuscle.
Figure 1C:
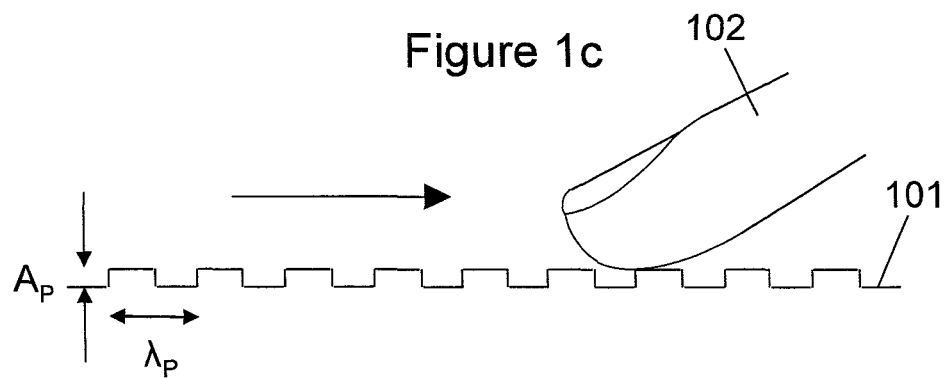
FIG. 1c shows a surface with a roughness which has been tuned for detection by the Pacinian corpuscle.

FIG. 1b illustrates schematically a surface 101 with a predetermined (periodic) roughness. In this case, the wavelength of the roughness, denoted "$\lambda_M$", has been chosen to produce a predefined vibration in the skin with a frequency which is detectable specifically by the Meissner corpuscle. The wavelength required to achieve this is dependent on the speed of the finger 102. For example, in order for the Meissner corpuscle to accurately detect vibrations at a finger speed of 0.1 m/s, the wavelength should be between 2 and 10 mm. Textures with roughness wavelengths outside of this range may also be detected, but the signal will be weaker. Likewise, for the detection of vibrations using the Pacinian corpuscle and a finger speed of 0.1 m/s, the optimum wavelength is between 0.25 and 0.5 mm, although a roughness lengthscale as low as 0.1 mm may also be detected. Furthermore, stimulation of the Merkel disc at a finger speed of 0.1 m/s requires a roughness wavelength of between 6 and 20 mm. FIG. 1c shows a surface 101 with a wavelength, denoted "$\lambda_P$", specifically chosen to stimulate the Pacinian corpuscle.

Whilst the wavelength of the roughness is an important consideration, so too is the amplitude of the roughness. For accurate detection of surface texture, the amplitude of vibration must be above a particular threshold for a given vibrational frequency. Given the operational frequencies of each receptor, the corresponding amplitude thresholds for the Pacinian corpuscle, Meissner corpuscle and Merkel disc are 1-100 µm, ~100 µm, and 100-200 µm, respectively. Therefore, in order to stimulate these receptors, the height of each feature must be above the corresponding amplitude threshold. In FIG. 1b, the amplitude of the roughness, "$A_M$" has been tuned to fit the Meissner corpuscle, whilst in FIG. 1c, the amplitude of the roughness, "$A_P$" has tuned to fit the Pacinian corpuscle.

As mentioned in the background section, one method of generating vibrations in the skin is to incorporate an electrotactile system in the display of an electronic device. This technology is based on electrovibration, in which the mechanoreceptors are deceived into perceiving texture when a fingertip is swiped across an insulating layer above an electrical conductor carrying an alternating potential. This effect is due to the varying electrostatic attraction between the conductor and the deeper, liquid-rich conducting layers of the skin—an effect which changes the perceived dynamic function.

Figure 2A:
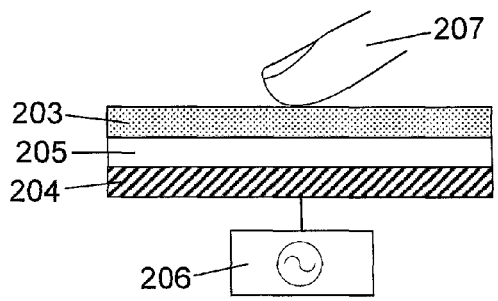
FIG. 2a shows one embodiment of a device configured to provide haptic feedback.

FIG. 2a shows a device incorporating an electrotactile system. The device comprises an electronic display 203, an electrically conducting layer 204 (referred to herein as the electrotactile layer), an electrically insulating layer 205 and a power supply 206, the electrically insulating layer 205 positioned between a user 207 of the device and the electrotactile layer 204. The power supply 206 is configured to charge the electrotactile layer 204, and the electrically insulating layer 205 is configured to prevent a flow of current between the electrotactile layer 204 and the skin of the user 207 when the user 207 is proximate to the electrotactile layer 204. The electrically insulating layer 205 may be unnecessary, however, if the electronic display 203 is electrically insulating.

The electrotactile layer 204 is configured to allow establishment of an electric field between itself and the user 207. To achieve this, the power supply 206 charges the electrotactile layer 204, and the charge on the electrotactile layer 204 induces charges of opposite polarity on the skin of the user 207. The build up of charge on the electrotactile layer 204 and the user 207 is what forms the electric field. This may be visualised as a (dynamic) capacitor, where the electrotactile layer 204 is the first electrode and the user 207 is the second electrode, the first and second electrodes separated by an electrical insulator 205. The electrostatic force generated by the charge on the electrotactile layer 204 attracts the charge on the user 207 causing movement of the user's skin.

To generate vibration in the skin of the user 207, the power supply 206 varies the magnitude (and/or polarity) of charge on the electrotactile layer 204 periodically. The variation of charge causes variations in electric field strength (and/or direction) which in turn causes vibration in the skin. By controlling the electric field strength, it is possible to tune the frequency and amplitude of the skin vibrations to a specific receptor. Unlike some other types of haptic feedback technology, physical contact between the user 207 and the device is not required because the electrotactile layer 204 couples capacitively to the user's skin, or any other stylus, via the electric field (i.e. action at a distance). In some embodiments, the electrotactile layer may be divided into a plurality of individually controllable segments. This configuration allows one segment to provide a different amplitude and/or frequency of vibration than another segment such that the haptic feedback is different at different regions of the display.

Figure 2B:
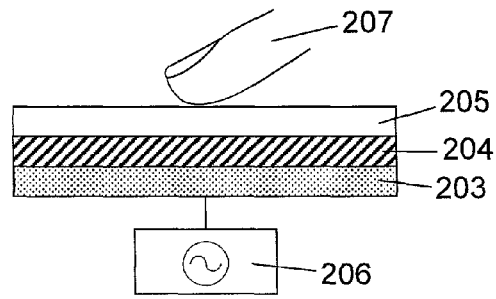
FIG. 2b shows another embodiment of a device configured to provide haptic feedback.

In an alternative configuration (shown in FIG. 2b), the electronic display 203 is located below the electrotactile layer 204 and electrically insulating layer 205. This configuration reduces the distance between the electrotactile layer 204 and the user 207, which increases the capacitance. This arrangement therefore allows a smaller potential to be applied to the electrotactile layer 204 to produce the same electrostatic force on the user's skin, which helps to reduce the power consumption of the electrotactile system. The configuration of FIG. 2b, unlike that FIG. 2a, requires the electrotactile layer 204 and electrically insulating layer 205 to be substantially optically transparent, otherwise the user may be unable to see the underlying electronic display 203. In both configurations, however, one or more of the layers (electronic display 203, electrically insulating layer 205 and electrotactile layer 204) may be made from a stretchable and/or flexible material.

Touchscreen interfaces are electronic visual displays which can detect the presence and location of a touch input within the display area. The term "touchscreen" generally refers to interfaces which interact with a user's finger, but most technologies can also sense other passive objects, such as a stylus. The touchscreen has two main attributes. Firstly, it enables a user to interact directly with what is displayed, rather than indirectly via an onscreen pointer. Secondly, it removes the need for any intermediate input device, such as a mouse or touchpad, which would otherwise be required for controlling the onscreen pointer.

A variety of different touchscreen technologies currently exist. One of these is capacitive touchscreen technology, which encompasses both self-capacitive systems and mutually-capacitive systems.

Figure 3A:
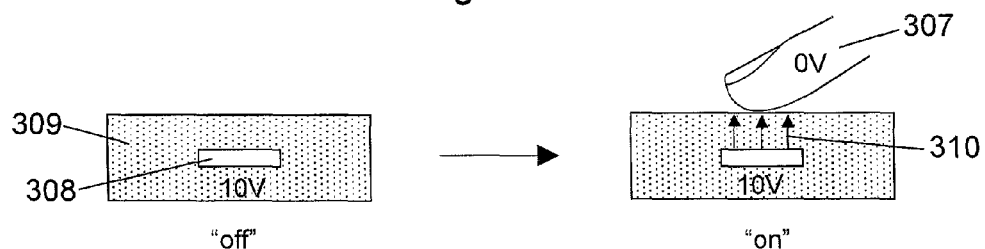
FIG. 3a shows the detection of a touch input by a self-capacitive touch sensor.

A self-capacitive touch sensor (as illustrated in FIG. 3a) comprises an electrical conductor 308 (electrode) separated from the external environment by an electrical insulator 309. Like the electrotactile system, a potential (10V in the examples illustrated) is applied to charge the electrode 308. When the user's finger 307 or a stylus (which will usually be grounded) is brought into proximity of the charged electrode 308 (e.g. by touching the electrical insulator 309), opposite charges are induced on the finger/stylus 307 and an electric field 310 is formed therebetween (i.e. the electrode 308 couples capacitively to the user/stylus 307). The electrode 308 and the user/stylus 307 effectively serve as the opposite plates of a (dynamic) capacitor. Therefore, when the user/stylus 307 approaches the sensor, the total capacitance associated with the electrode 308 increases. This change in capacitance is then detected, and if the change exceeds a predetermined threshold value, the sensor interprets this as a touch input. As shown in FIG. 3a, the sensor changes from an "off" state (no touch input) to an "on" state (touch input detected).

Figure 3B:
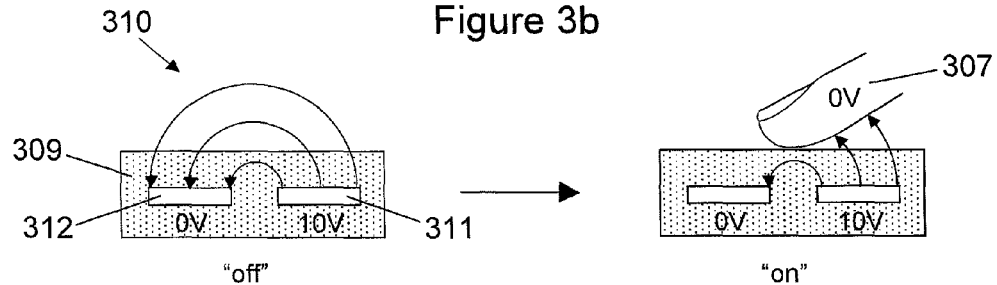
FIG. 3b shows the detection of a touch input by a horizontally-arranged mutually-capacitive touch sensor.

A mutually-capacitive touch sensor (as illustrated in FIG. 3b), however, comprises first 311 and second 312 electrical conductors (transmitter 311 and receiver 312 electrodes). A potential is then applied to charge the transmitter electrode 311, which generates an electric field 310 between itself and the receiver electrode 312. The transmitter 311 and receiver 312 electrodes effectively serve as the opposite plates of a capacitor, and the capacitance associated with the receiver electrode 312 is measured. In the example shown, the electrodes 311, 312 lie in the same plane (i.e. a horizontally-arranged mutually-capacitive sensor). In this configuration, the stray field lines 310 extend above the plane of the electrodes 311, 312 into the region external to the device. When the user's finger 307 or a stylus is brought into proximity of the sensor, the finger/stylus 307 interferes with the electric field 310 (i.e. the transmitter electrode 311 couples capacitively to the user/stylus 307). In this way, the capacitance associated with the receiver electrode 312 decreases. As with the self-capacitive touch sensor, the change in capacitance is detected. If the change exceeds a predetermined threshold value, the sensor interprets this as a touch input.

Figure 3C:
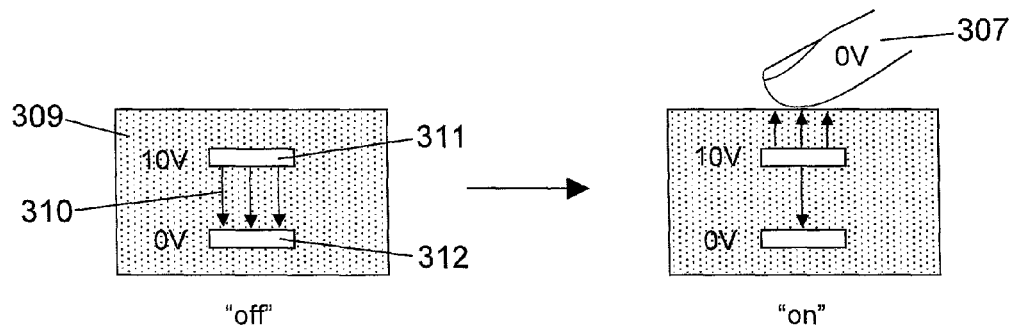
FIG. 3c shows the detection of a touch input by a vertically-arranged mutually-capacitive touch sensor.

To increase the resolution of a mutually-capacitive touch sensor array, the transmitter 311 and receiver 312 electrodes of each sensor may be arranged one on top of the other (i.e. a vertically-arranged mutually-capacitive sensor). This arrangement is illustrated in FIG. 3c. In this configuration, the user's finger/stylus 307 couples capacitively to the transmitter electrode 311 (similar to the electrode 308 of a self-capacitive sensor), causing a decrease in the capacitance associated with the receiver electrode 312.

By using an array of capacitive touch sensors, it is possible to pin-point the position of touch by averaging the signals from multiple sensors. This is useful when the touch input lies between adjacent sensors or spans multiple sensors. Whilst this allows the detection of touch inputs which lie between adjacent sensors, the detection tends to be more accurate when the position of touch coincides with the position of a sensor. For this reason, a greater density of sensors is usually advantageous.

As mentioned briefly in the background section, the integration of capacitive touchscreen and electrotactile technology presents various technical problems which must be overcome if these systems are to function properly in the same device.

Figure 4A:
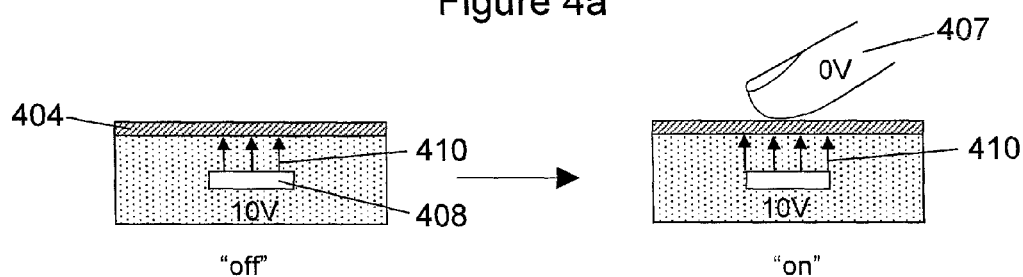
FIG. 4a shows how the presence of an electrotactile layer can hinder the detection of a touch input by a self-capacitive touch sensor.

FIG. 4a illustrates the scenario where an electrotactile system is integrated with self-capacitive touchscreen technology. As discussed above, an alternating voltage is applied to the electrotacile layer 404 when haptic feedback is required, and removed again when haptic feedback is not required. When the alternating voltage is not being applied, the electrotactile layer 404 may be grounded or floating. There are therefore moments in time when a potential difference exists between the capacitive touch sensors and the electrotactile layer 404. In the examples illustrated, the electrotactile layer 404 is at a floating potential (when the electrotactile layer in the "off" state) and the capacitive touch sensors are held at 10V (when the sensors are in the "on" state). The potential difference results in capacitive cross-coupling between the capacitive touch sensors and the electrotactile layer 404, which is represented by electric field lines 410 in the figures.

Capacitive cross-coupling may prevent the detection of a touch input by the sensors. This is because the electrotactile layer 404 forms a capacitor with the sensor electrode 408 (compare FIG. 4a with FIG. 3a). As a result, the capacitance associated with the electrode 408 is relatively large before a touch input has been provided. When the user's finger 407 (or stylus) is then brought into proximity of the sensor, the capacitance associated with the electrode 408 increases, but the difference in capacitance is reduced by the presence of the electrotactile layer 404. This is depicted by an increase of one field line in FIG. 4a compared to an increase of three field lines in FIG. 3a. It is therefore more difficult for the system to distinguish between the "on" state and the "off" state as a result of the electrotactile layer 404.

Figure 4B:
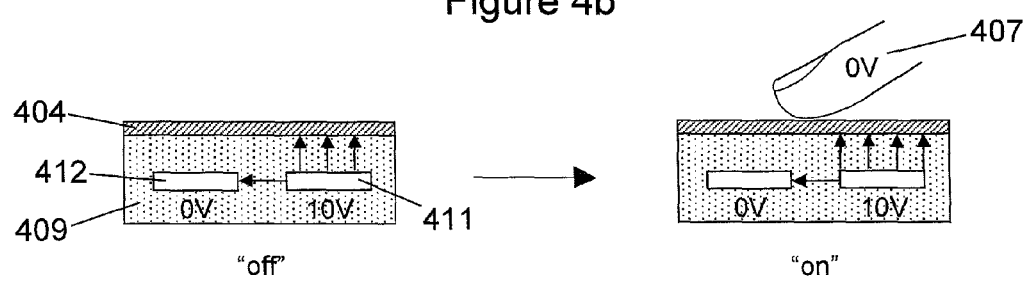
FIG. 4b shows how the presence of an electrotactile layer can hinder the detection of a touch input by a horizontally-arranged mutually-capacitive touch sensor.
Figure 4C:
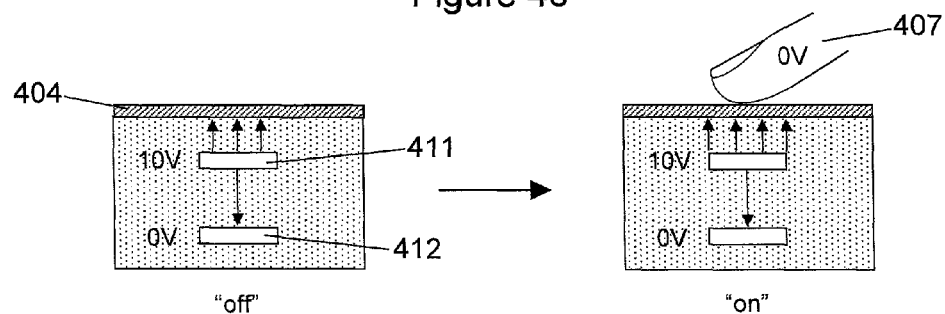
FIG. 4c shows how the presence of an electrotactile layer can hinder the detection of a touch input by a vertically-arranged mutually-capacitive touch sensor.
Figure 5A:
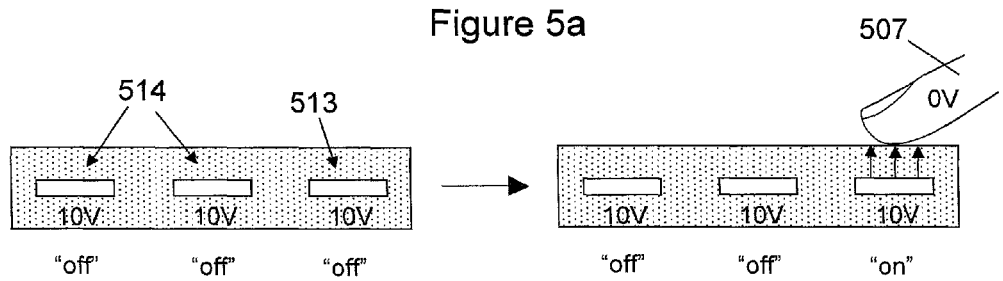
FIG. 5a shows a plurality of self-capacitive touch sensors.
Figure 5B:
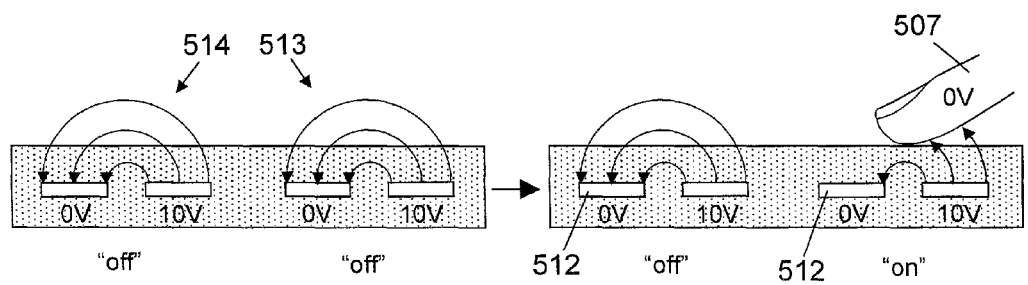
FIG. 5b shows a plurality of horizontally-arranged mutually-capacitive touch sensors.
Figure 5C:
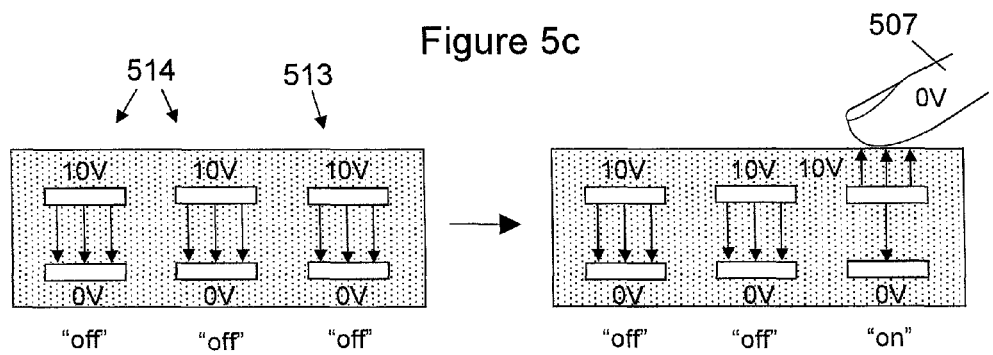
FIG. 5c shows a plurality of vertically-arranged mutually-capacitive touch sensors.

A similar scenario occurs when an electrotactile system is integrated with mutually-capacitive touch sensors. FIG. 4b shows a horizontally-arranged sensor whilst FIG. 4c shows a vertically-arranged sensor. In FIG. 4b, the stray field lines, which would normally extend beyond the electrical insulator 409, are intercepted by the electrotactile layer 404. As a result, the capacitance associated with the receiver electrode 412 is relatively small before a touch input has been provided. When the user's finger 407 (or stylus) is then brought into proximity of the sensor, the capacitance associated with the transmitter electrode 411 increases, but the decrease in capacitance associated with the receiver electrode 412 (which is used to determine whether or not a touch input has occurred) is negligible. This is depicted by a single field line between the transmitter 411 and receiver 412 electrodes before and during the touch input. The electrotactile layer has a similar effect on the vertically-arranged sensor of FIG. 4c, Capacitive cross-coupling can also lead to accidental triggering of other sensors 514 in the array when a touch input is applied to a first sensor 513. FIGS. 5a-5c illustrate how a plurality of touch sensors 513, 514 should operate under normal conditions (i.e. in the absence of an electrotactile layer). In FIG. 5a, the user's finger/stylus 507 causes an increase in capacitance at one of the self-capacitive sensors 513, but not the others 514. As a result, the system detects a touch input at this sensor 513 only (i.e. the state switches from "off" to "on"). A similar scenario occurs with the mutually-capacitive touch sensors in FIGS. 5b and 5c, where the user's finger/stylus reduces the capacitance at the receiver electrode 512 of the right-hand sensor 513 but not at the receiver electrode 512 of the other sensor(s) 514.

Figure 6A:
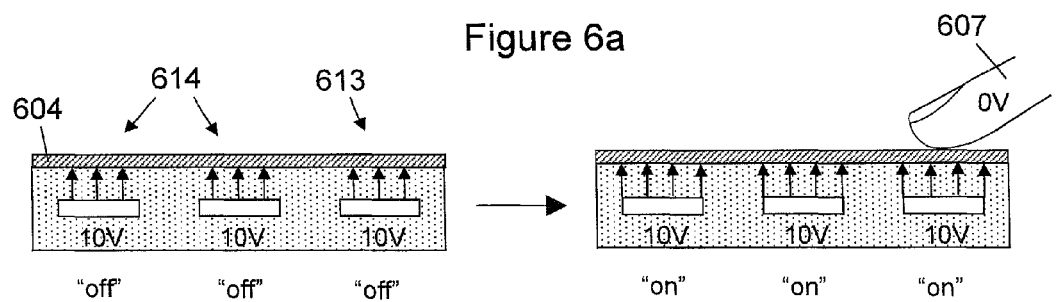
FIG. 6a shows how an electrotactile layer can cause accidental triggering of self-capacitive touch sensors.
Figure 6B:
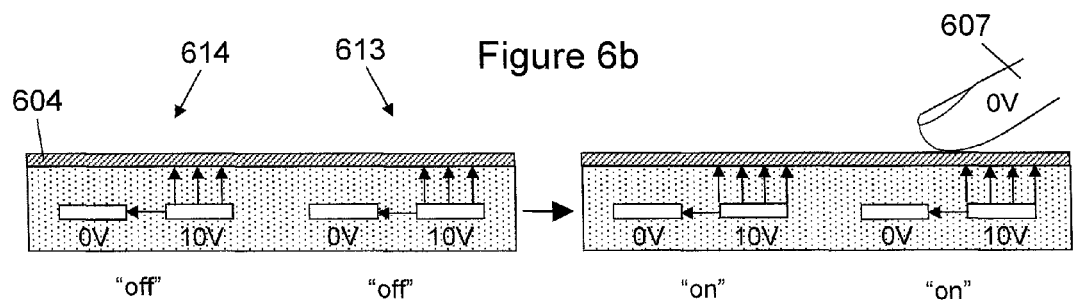
FIG. 6b shows how an electrotactile layer can cause accidental triggering of horizontally-arranged mutually-capacitive touch sensors.

FIGS. 6a-6c illustrate the effect of adding an electrotactile layer 604 to each of the different sensor arrays. When the user's finger/stylus 607 is brought into proximity of the right-hand sensor 613 in each case, the capacitance associated with this sensor 613 varies as expected. However, since each of the sensors 613, 614 are cross-coupled to the electrotactile layer 604, the capacitance associated with the other sensors 614 also varies. In this way, a single touch input applied to one sensor 613 can also affect the state of the other sensors 614 (i.e. each sensor switches from the "on" state to the "off" state). In a touchscreen device, this problem may manifest itself as unintentional selection of onscreen content.

The present apparatus addresses the above-mentioned issues by including one or more apertures in the electrotactile layer. To achieve this, the dimensions, positioning and/or shape of the apertures are chosen to reduce the capacitive cross-coupling between the capacitive touch sensors and the electrotactile layer. Essentially, the apertures act to increase the distance between each sensor and the material which forms the electrotactile layer such that the capacitive cross-coupling causes a negligible variation in the capacitance of the sensors. The dimensions, positioning and/or shape of the apertures may be chosen such that the material used to form the electrotactile layer does not completely overlap with the underlying or overlying sensors. For example, the material used to form the electrotactile layer may partially overlap with the sensors (covering up to 10%, 25% or 50% of each sensor), or it may not overlap with the first sensor at all (i.e. none of the material used to form the electrotactile layer is located directly above or below the sensors). It is important in all embodiments, however, that the apertures do not prevent the electrotactile layer from providing haptic feedback to the user. In particular, the electrotactile layer should be able to provide haptic feedback to the user in response to a touch input.

FIGS. 7a and 7b illustrate two different configurations of electrotactile layer 704. In FIG. 7a, the electrotactile layer 704 comprises a plurality of circular apertures 715, whilst in FIG. 7b, the electrotactile layer 704 comprises a plurality of square apertures 716. In each configuration, the material of the electrotactile layer 704 forms a mesh-like structure. The apertures 715 may alternatively have an elliptical, diamond or trapezoidal shape. Instead of a mesh, the electrotactile layer may comprise a plurality of parallel or interdigitated strips, the gaps between adjacent strips constituting the apertures of the electrotactile layer. In this configuration, every second strip may be grounded to provide a potential difference between adjacent strips.

Each aperture 715 may be configured to reduce the capacitive cross-coupling between one sensor and the electrotactile layer 704, or may be configured to reduce the capacitive cross-coupling between multiple sensors and the electrotactile layer 704.

Where the apertures are the gaps between parallel strips of material, each aperture may be configured to reduce the capacitive cross-coupling between one or more series of sensors and the electrotactile layer. The number of sensors affected by each aperture 715 may be controlled simply by varying the periodicity of the apertures.

The material used to form the electrotactile layer 704 may comprise conductive (e.g. a metal such as gold, silver or copper) or semiconductive (e.g. indium tin oxide or vanadium oxide) material. In addition, the electrotactile layer 704 may be formed as a thin film or as a network of silver, carbon or graphene nanowires.

Typically, the electrotactile layer 704 would be positioned above the sensor array and electronic display of the device (i.e. closest to the user) in order to provide sufficient haptic feedback to the user without excessive voltage and power consumption (although this is not essential). In this scenario, the material used to form the electrotactile layer 704 should be optically transparent to allow the user to see the underlying electronic display. The electrotactile layer 704 should also be separated from the user's finger/stylus and the underlying sensor array by layers of electrically insulating material in order to prevent a flow of current therebetween.

Figure 8B:
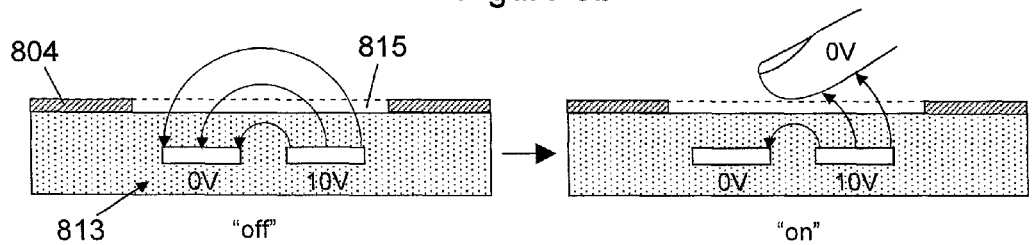
FIG. 8b shows how an aperture in an electrotactile layer can facilitate detection of a touch input by a horizontally-arranged mutually-capacitive touch sensor.
Figure 8C:
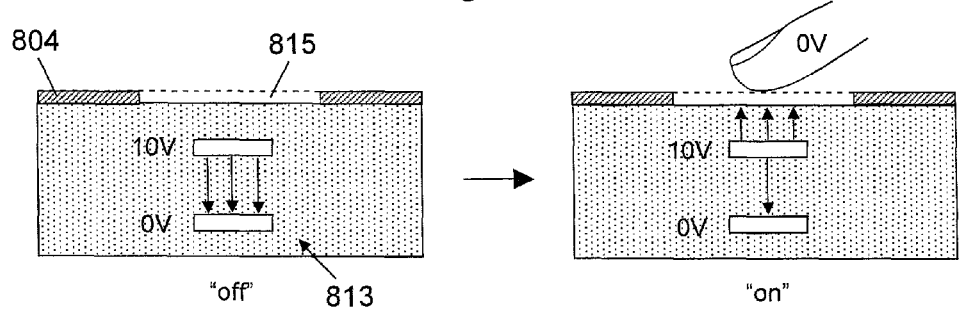
FIG. 8c shows how an aperture in an electrotactile layer can facilitate detection of a touch input by a vertically-arranged mutually-capacitive touch sensor.

FIGS. 8a-8c illustrate the effect of the apertures 815 on a single sensor 813. In each figure, the apertures 815 reduce capacitive cross-coupling between the sensor 813 and the electrotactile layer 804. In this way, the variation in sensor capacitance caused by the electrotactile layer 804 is negligible/manageable, thereby allowing the sensor 813 to function as though the electrotactile layer 804 was absent from the structure (i.e. similar behaviour to FIGS. 3a-3c).

It should be noted, however, that the size of the apertures in relation to the size of the finger/stylus in FIGS. 8 and 9 is exaggerated for illustrative purposes. As stated above, the electrotactile layer should be able to provide haptic feedback to the user in response to a touch input. In practice, therefore, the apertures should be small enough to allow the finger/stylus to bridge the gap between adjacent strips of the electrotactile layer. Quantitatively, this equates to a maximum aperture dimension ("x" in FIGS. 7a and 7b) of up to 2, 3, 4 or 5 mm (depending on the size of the sensors).

Furthermore, whilst the apertures are centred over the underlying sensors in FIGS. 7 and 8, this is only one possible arrangement. In practice, the apertures may be centred as shown, but they could be offset from this position provided that they are still able to reduce the capacitive cross-coupling between the sensors and the electrotactile layer.

Figure 9A:
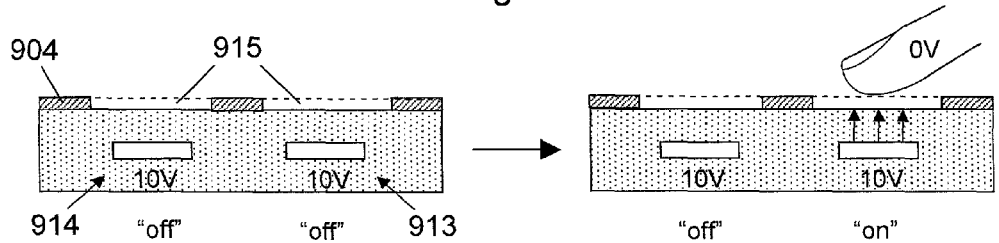
FIG. 9a shows how an aperture in an electrotactile layer can prevent accidental triggering of self-capacitive touch sensors.
Figure 9B:
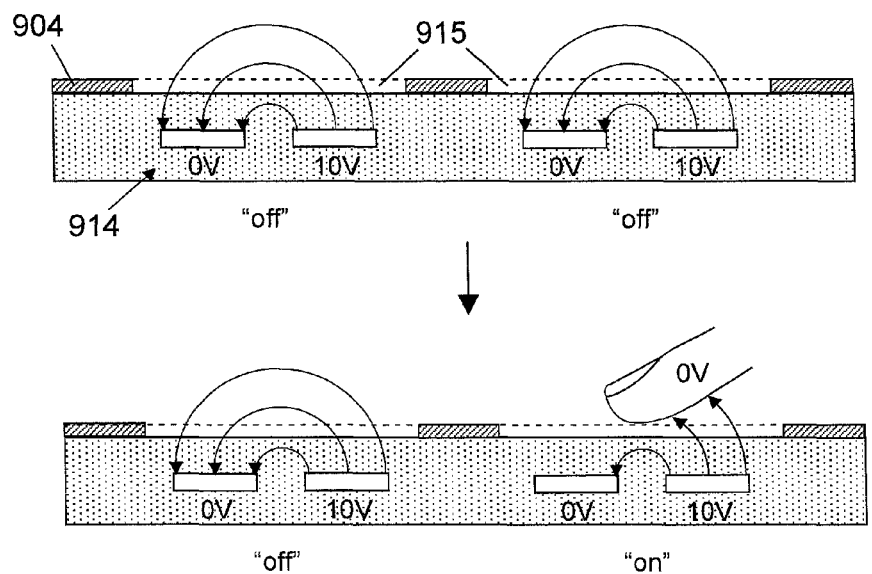
FIG. 9b shows how an aperture in an electrotactile layer can prevent accidental triggering of horizontally-arranged mutually-capacitive touch sensors.
Figure 9C:
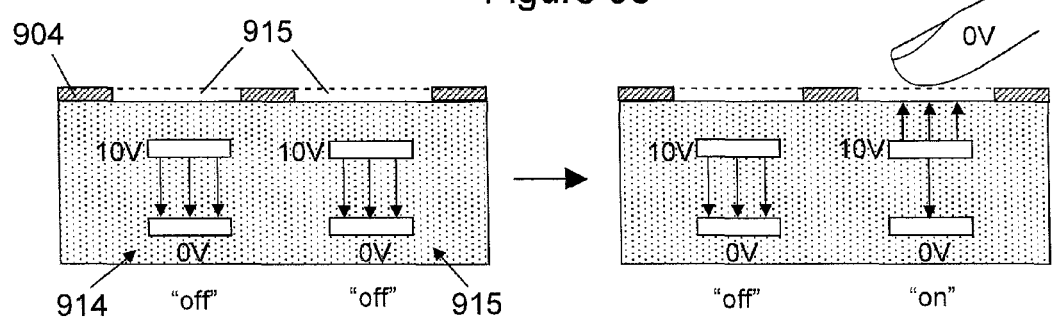
FIG. 9c shows how an aperture in an electrotactile layer can prevent accidental triggering of vertically-arranged mutually-capacitive touch sensors.

FIGS. 9a-9c illustrate the effect of the apertures 915 on a sensor array. In each figure, the apertures 915 reduce capacitive cross-coupling between the respective sensors 913, 914 and the electrotactile layer 904. In this way, the variation in capacitance caused by a touch input at the right-hand sensor 913 has little effect on the capacitance of the other sensor(s) 914, thereby preventing unintentional activation of the other sensor(s) 914 (i.e. similar behaviour to FIGS. 5a-5c).

Another problem encountered when capacitive touchscreen and electrotactile technology is integrated within the same device is that the electrotactile layer can induce charges on the capacitive touch sensors when the electrotactile layer is in the "on" state (i.e. when a potential is applied to the electrotactile layer to provide haptic feedback).

Figure 10:
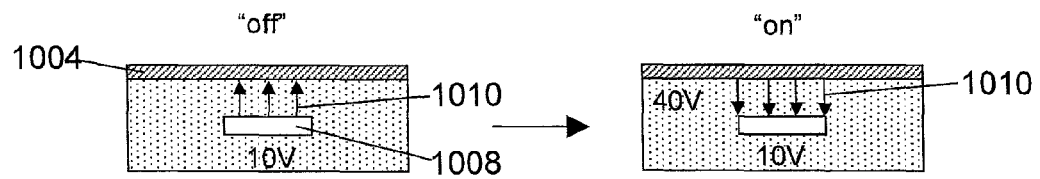
FIG. 10 shows how the transfer of charge from an electrotactile layer to a capacitive touch sensor can hinder the detection of a touch input by the sensor.

FIG. 10 shows the capacitive cross-coupling between the electrotactile layer 1004 and a self-capacitive touch sensor 1008 when the electrotactile layer 1004 is in the "off" state and "on" state, respectively. In the "off" state, the electrotactile layer 1004 is at a floating potential which is less than the potential applied to the underlying sensor 1008 (10V in this example). In this configuration, the sensor 1008 induces charge on the electrotactile layer 1004 as a result of the capacitive cross-coupling (illustrated by the electric field lines 1010 from the sensor 1008 to the electrotactile layer 1004).

When the electrotactile layer 1004 is in the "on" state, however, a potential (40V in this example) is applied to the electrotactile layer 1004 to provide haptic feedback to a user, which is typically greater than the potential applied to the underlying sensor 1008 (10V in this example). In this configuration, the electrotactile layer 1004 induces charge on the sensor 1008 as a result of the capacitive cross-coupling (illustrated by the electric field lines 1010 from the electrotactile layer 1004 to the sensor 1008). As a result of this charge transfer, the sensor 1008 is incapable of inducing charge on a finger/stylus and therefore detecting a touch input. Furthermore, as a result of the large potential applied to the electrotactile layer 1004 (relative to that applied to the sensor 1008), the magnitude of charge induced on the sensor 1008 can potentially damage the integrated circuit (IC) of the capacitive touch sensor 1008. The same problems exist when horizontally or vertically arranged mutually-capacitive touch sensors (shown in FIGS. 4b and 4c) are used instead of self-capacitive touch sensors 1008. Whilst the use of apertures in the electrotactile layer 1004 may help to alleviate these problems by reducing the capacitive cross-coupling between the electrotactile layer 1004 and the sensors 1008, an additional or alternative solution may be required.

Figure 11A:
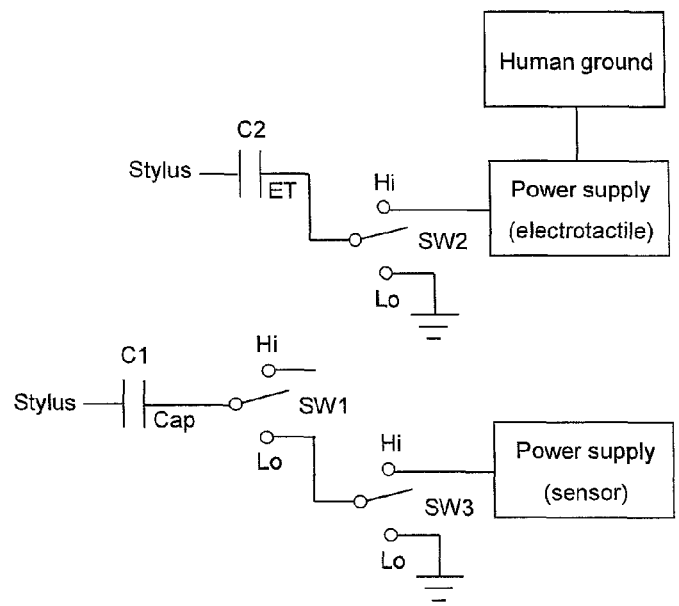
FIG. 11a shows how a series of switches can be used to prevent the transfer of charge from an electrotactile layer to a self-capacitive touch sensor.

One option is to alternate operation of the electrotactile layer and the touch sensor(s). FIG. 11a shows a possible circuit diagram for a device comprising a self-capacitive touch sensor and an electrotactile layer. The sensor electrode (Cap) and electrotactile layer (ET) each form capacitors (denoted C1 and C2) with a user's finger/stylus. The human ground is used to ground the user or the stylus when the user/stylus is in proximity to the electrotactile layer but does not affect the sensor electrode (Cap). This feature is not absolutely necessary in order to feel the haptic feedback (because the user will act as a ground), but it may enhance the sensation. Furthermore, the human ground is not required when the electrotactile has an interdigitated configuration and every second strip is grounded.

This circuit comprises three switches (SW1-SW3) which are operated simultaneously in the following sequence of time steps. In a first time step, switches SW1, SW2 and SW3 are set to "hi", "hi" and "low", respectively (although switch SW3 could be left floating rather than being grounded). In this configuration, the electrotactile layer (ET) is connected to its power supply (which may be the same power supply as the capacitive touch sensor) but the sensor electrode (Cap) is not. In a second time step, switches SW1, SW2 and SW3 are each set to "low". In this configuration, the electrotactile layer (ET) and sensor electrode (Cap) are both connected to ground causing them to discharge. In a third time step, switches SW1, SW2 and SW3 are set to "low", "low" and "hi", respectively (although switch SW2 could be left floating rather than being grounded). In this configuration, the sensor electrode (Cap) is connected to its power supply but the electrotactile layer (ET) is not.

Since the capacitive touch sensor is switched "on" whilst the electrotactile layer is switched "off" (and vice versa), the high potential applied to the electrotactile layer does not affect operation of the sensor, and the charge transferred from the electrotactile layer to the sensor electrode is unable to damage the sensor IC. Capacitive cross-coupling between the electrotactile layer and the capacitive touch sensor when the electrotactile layer is switched "off" (grounded or held at a floating potential), however, is still an issue, but this can be reduced using apertures in the electrotactile layer as described previously.

Figure 11B:
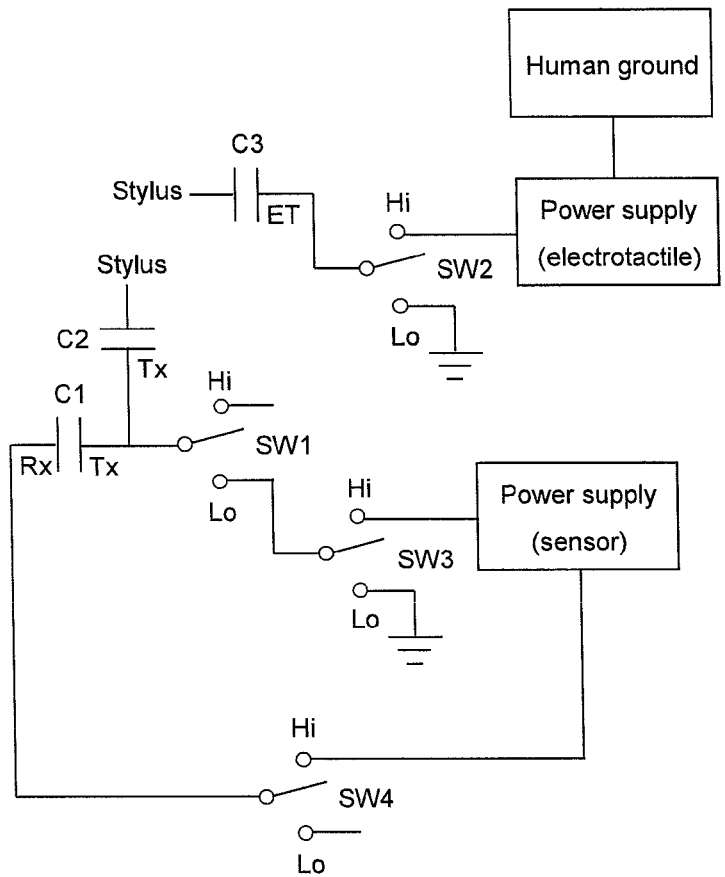
FIG. 11b shows how a series of switches can be used to prevent the transfer of charge from an electrotactile layer to a mutually-capacitive touch sensor.

FIG. 11b shows a similar circuit diagram for a device comprising a mutually-capacitive touch sensor and an electrotactile layer. In this case, the transmitter electrode (Tx) of the sensor forms one capacitor (denoted C1) with the receiver electrode (Rx) of the sensor, and another capacitor (denoted C2) with the user's finger/stylus. In addition, the electrotactile layer (ET) forms a third capacitor (denoted C3) with the user's finger/stylus.

This circuit comprises four switches (SW1-SW4) which are operated simultaneously in the following sequence of time steps. In a first time step, switches SW1 and SW2 are set to "hi", and switches SW3 and SW4 are set to "low". In this configuration, the electrotactile layer (ET) is connected to its power supply but the transmitter (Tx) and receiver (Rx) electrodes of the sensor are not. In the second time step, switches SW1-SW4 are each set to "low". In this configuration, the electrotactile layer (ET), transmitter electrode (Tx) and receiver electrode (Rx) are all connected to ground causing them to discharge. In the third time step, switches SW1 and SW2 are set to "low", and switches SW3 and SW4 are set to "hi". In this configuration, the transmitter (Tx) and receiver (Rx) electrodes are connected to the power supply but the electrotactile layer (ET) is not.

The circuit diagrams of FIGS. 11a and 11b show connections to a single sensor. However, the same principles may be applied to an array of sensors. This can be accomplished by multiplexing (not shown) the connection between switch SW1 and the sensor electrode (Cap) in FIG. 11a, and by multiplexing (not shown) the connection between switch SW1 and the transmitter electrode (Tx), and the connection between switch SW4 and the receiver electrode (Rx), in FIG. 11b.

It should be noted that the sensor power supply shown in FIGS. 11a and 11b may in fact be measurement electronics for the sensors. In other words, rather than connecting and disconnecting the sensors from the power supply, the sensors could just be connected and disconnected from the measurement electronics.

Figure 12:
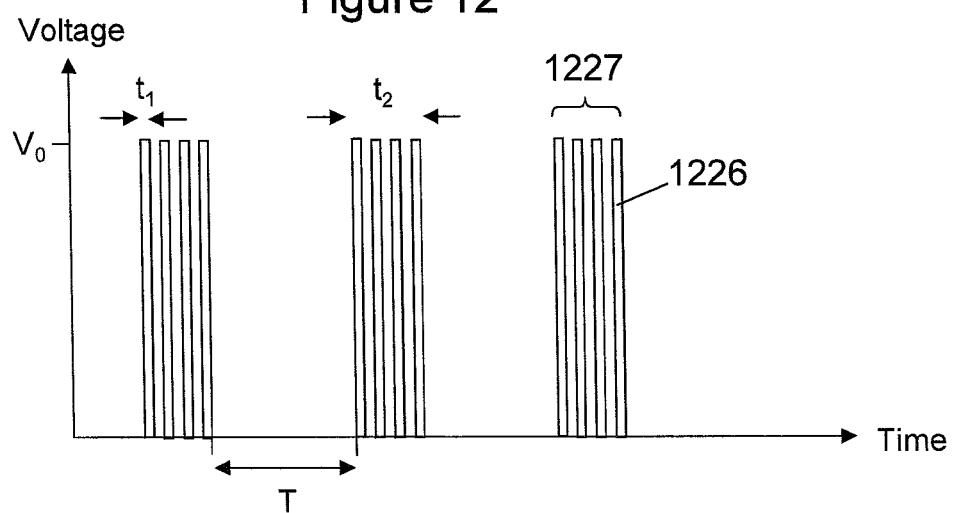
FIG. 12 shows a typical electrotactile signal for providing haptic feedback.

As shown in FIG. 12, the electrotactile signal for providing haptic feedback comprises a train of short, sharp pulses 1226 (with an amplitude $V_0$ and a typical duration $t_1$ of 10-50 μs) which are grouped together to form a basic pulse 1227 (with an amplitude $V_0$ and a typical duration $t_2$ of 0.5-2 ms). The frequency of the basic pulses 1227 is what determines the perceived frequency of vibration in the haptic feedback.

Integrated circuits for existing capacitive touch sensor arrays are capable of scanning the array (to determine whether a touch input has been applied or not) at a frequency of up to 1200 Hz, possibly higher. Therefore, if the frequency of the basic electrotactile pulses 1227 is set to 10-500 Hz, there is a sufficient time window T for the capacitive sensor IC to detect a touch input. For example, if the basic electrotactile pulses 1227 have a frequency of 10 Hz, the capacitive sensor IC could scan the sensor array up to 120 times in the time period (T) when the electrotactile layer is switched off.

In light of the above, the first time step should be chosen to provide a basic pulse 1227 of suitable duration (e.g. 0.5-2 ms). In addition, the duration between the first time step of one cycle and the first time step of the subsequent cycle (i.e. the second and third time steps combined) should be chosen to enable the capacitive sensor IC to scan the sensor array a sufficient number of times to determine whether or not a touch input has been provided.

Figure 13:
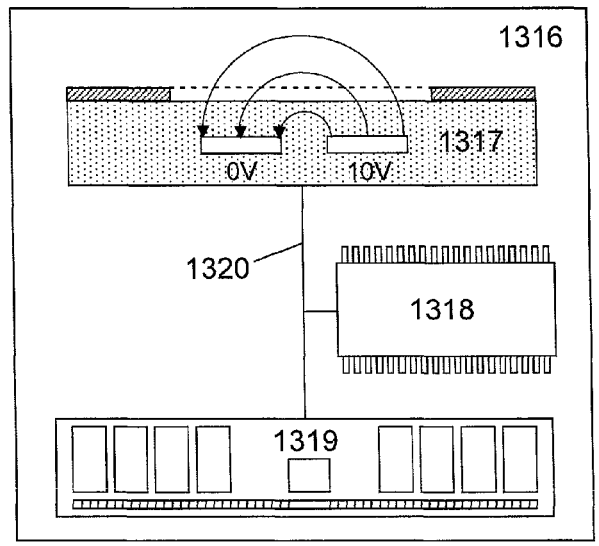
FIG. 13 shows a device comprising the apparatus described herein.

FIG. 13 illustrates schematically a device 1316 comprising the apparatus 1317 described herein. The device 1316 also comprises a processor 1318, and a storage medium 1319, which are electrically connected to one another by a data bus 1320. The device 1316 may be an electronic device, a portable electronic device, a portable telecommunications device, a touchscreen display for any of the aforementioned devices, or a module for any of the aforementioned devices.

The apparatus 1317, together with the processor 1318 and storage medium 1319, is configured to detect touch input by a user of the device 1316, and provide haptic feedback to the user. The haptic feedback may be in response to the detected touch input.

The processor 1318 is configured for general operation of the device 1317 by providing signalling to, and receiving signalling from, the other device components to manage their operation. In particular, the processor 1318 may be configured to set the voltages of the electrotactile layer and capacitive touch sensors, and may be configured to monitor the capacitance associated with each sensor.

The storage medium 1319 is configured to store computer code configured to perform, control or enable operation of the apparatus 1317. The storage medium 1319 may also be configured to store settings (e.g. the operation voltages of the electrotactile layer and the capacitive touch sensors) for the other device components. The processor 1318 may access the storage medium 1319 to retrieve the component settings in order to manage the operation of the other device components. In particular, the storage medium 1319 may store a predetermined threshold value for the capacitance of each sensor. The processor 1318 may then compare the present capacitance of each sensor with the predetermined threshold to determine if a touch input has occurred. This may involve averaging the signals from multiple sensors to detect touch inputs that do not coincide with the position of a single sensor (e.g. the touch input lies between adjacent sensors or spans multiple sensors). In addition, the processor 1318 may run a corresponding piece of software (also stored in the storage medium 1319) in response to a detected touch input. The storage medium 1319 may be a temporary storage medium such as a volatile random access memory. On the other hand, the storage medium 1319 may be a permanent storage medium such as a hard disk drive, a flash memory, or a non-volatile random access memory.

Figure 14:
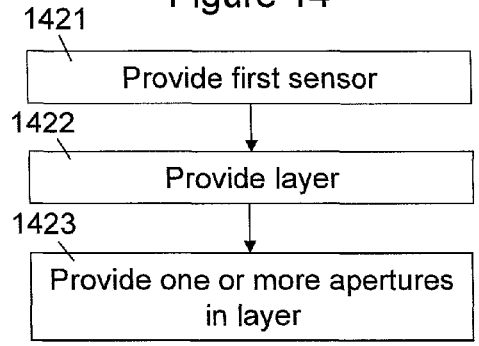
FIG. 14 shows a method of making the apparatus described herein.
Figure 15:
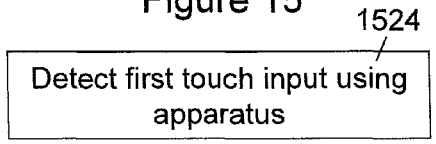
FIG. 15 shows a method of using the apparatus described herein.

The main steps 1421-1423 of the method used to make the apparatus 1317 are illustrated schematically in FIG. 14. Likewise, the main step 1524 of the method used to operate the apparatus 1317 is illustrated schematically in FIG. 15.

Figure 16:
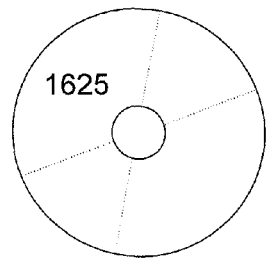
FIG. 16 shows a computer readable medium comprising a computer program for controlling the making and/or use of the apparatus described herein.

FIG. 16 illustrates schematically a computer/processor readable medium 1625 providing a computer program according to one embodiment. In this example, the computer/processor readable medium 1625 is a disc such as a digital versatile disc (DVD) or a compact disc (CD). In other embodiments, the computer/processor readable medium 1625 may be any medium that has been programmed in such a way as to carry out an inventive function. The computer/processor readable medium 1625 may be a removable memory device such as a memory stick or memory card (SD, mini SD or micro SD).

The computer program may comprise computer code configured to perform, control or enable the following: detection of a first touch input using an apparatus, the apparatus comprising a first sensor configured to couple capacitively to a stylus when said stylus is in proximity to the first sensor, capacitive coupling between the first sensor and the stylus configured to generate a first touch input signal to enable detection of a first touch input, and a layer configured to couple capacitively to the stylus when said stylus is in proximity to the layer, capacitive coupling between the layer and the stylus configured to provide haptic feedback, wherein the layer is positioned adjacent the first sensor, the positioning resulting in capacitive cross-coupling between the first sensor and the layer, and wherein the layer comprises one or more apertures configured to reduce the capacitive cross-coupling.

The computer program may also comprise computer code configured to perform, control or enable one or more of the following: provision of a first sensor configured to couple capacitively to a stylus when said stylus is in proximity to the first sensor, capacitive coupling between the first sensor and the stylus configured to generate a first touch input signal to enable detection of a first touch input; provision of a layer configured to couple capacitively to the stylus when said stylus is in proximity to the layer, capacitive coupling between the layer and the stylus configured to provide haptic feedback, wherein the layer is positioned adjacent the first sensor, the positioning resulting in capacitive cross-coupling between the first sensor and the layer; and provision of one or more apertures in the layer, the one or more apertures configured to reduce the capacitive cross-coupling.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a first sensor configured to couple capacitively to a stylus when said stylus is in proximity to the first sensor, capacitive coupling between the first sensor and the stylus configured to generate a first touch input signal to enable detection of a first touch input; and
a second sensor configured to couple capacitively to the stylus when said stylus is in proximity to the second sensor, capacitive coupling between the second sensor and the stylus configured to generate a second touch input signal to enable detection of a second touch input
a layer configured to couple capacitively to the stylus when said stylus is in proximity to the layer, capacitive coupling between the layer and the stylus configured to provide haptic feedback,
wherein the layer is positioned adjacent the first sensor, the positioning resulting in capacitive cross-coupling between the first sensor and the layer,
wherein the layer is positioned adjacent the second sensor, the positioning resulting in capacitive cross-coupling between the second sensor and the layer,
wherein the layer comprises one or more apertures configured to reduce the capacitive cross-coupling; and
wherein the dimensions, positioning and/or shape of the one or more apertures are chosen such that the capacitive cross-coupling is insufficient to cause the unintentional generation of a second touch input signal when the stylus couples capacitively to the first sensor.

2. The apparatus of claim 1, wherein the dimensions, positioning and/or shape of the one or more apertures are chosen such that the material used to form the layer does not completely overlap with the first sensor.

3. The apparatus of claim 1, wherein the dimensions, positioning and/or shape of the one or more apertures are chosen such that the layer is able to couple capacitively to the stylus when said stylus is positioned to provide a touch input to the first sensor.

4. The apparatus of claim 1, wherein the dimensions, positioning and/or shape of the one or more apertures are chosen such that the capacitive cross-coupling is insufficient to prevent detection of the first touch input when the stylus is in proximity to the first sensor.

5. The apparatus of claim 1, wherein the dimensions, positioning and/or shape of the one or more apertures are chosen such that the capacitive cross-coupling causes a negligible variation in the capacitance of the first sensor.

6. The apparatus of claim 1, wherein the first sensor comprises an electrode, the stylus forming a capacitor with the electrode when the stylus is in proximity to the first sensor, and wherein capacitive coupling between the first sensor and the stylus causes a variation in the capacitance of the electrode.

7. The apparatus of claim 1, wherein the first sensor comprises transmitter and receiver electrodes configured to generate an electric field therebetween, the stylus interfering with the electric field when the stylus is in proximity to the first sensor, and wherein capacitive coupling between the first sensor and the stylus causes a variation in the capacitance of the receiver electrode.

8. The apparatus of claim 1, wherein the apparatus comprises a plurality of sensors, each sensor configured to couple capacitively to the stylus when said stylus is in proximity to the sensor, capacitive coupling between each sensor and the stylus configured to generate a respective touch input signal to enable detection of a respective touch input,
wherein the layer is positioned adjacent the plurality of sensors, the positioning resulting in capacitive cross-coupling between each sensor and the layer, and
wherein the one or more apertures are configured to reduce the capacitive cross-coupling between each sensor and the layer.

9. The apparatus of claim 8, wherein the layer comprises a plurality of apertures, each aperture configured to reduce the capacitive cross-coupling between one sensor and the layer.

10. The apparatus of claim 8, wherein each aperture is configured to reduce the capacitive cross-coupling between multiple sensors and the layer.

11. The apparatus of claim 1, wherein the first sensor is a capacitive touch sensor.

12. The apparatus of claim 1, wherein the layer is an electrotactile layer.

13. The apparatus of claim 1, wherein the apparatus is one of the following: an electronic device, a portable electronic device, a portable telecommunications device, a touchscreen display for any of the aforementioned devices, and a module for any of the aforementioned devices.

14. A device comprising the apparatus of claim 1.

15. The apparatus of claim 1, wherein the dimensions, positioning and/or shape of the one or more apertures are chosen to reduce the capacitive cross-coupling.

16. A method comprising:
detecting a first touch input using an apparatus, the apparatus comprising a first sensor configured to couple capacitively to a stylus when said stylus is in proximity to the first sensor, capacitive coupling between the first sensor and the stylus configured to generate a first touch input signal to enable detection of a first touch input, and a layer configured to couple capacitively to the stylus when said stylus is in proximity to the layer, capacitive coupling between the layer and the stylus configured to provide haptic feedback;
positioning the layer adjacent the first sensor, the positioning resulting in capacitive cross-coupling between the first sensor and the layer, and wherein the layer comprises one or more apertures configured to reduce the capacitive cross-coupling; and
selecting the dimensions, positioning and/or shape of the one or more apertures to reduce the capacitive cross-coupling, such that the capacitive cross-coupling causes a negligible variation in the capacitance of the first sensor.

17. A computer program product embodying a computer program, recorded on a non-transitory computer readable medium, the computer program comprising computer code configured to:
detect a first touch input using an apparatus, the apparatus comprising a first sensor configured to couple capacitively to a stylus when said stylus is in proximity to the first sensor, capacitive coupling between the first sensor and the stylus configured to generate a first touch input signal to enable detection of a first touch input, and a layer configured to couple capacitively to the stylus when said stylus is in proximity to the layer, capacitive coupling between the layer and the stylus configured to provide haptic feedback;
positioning the layer adjacent the first sensor, the positioning resulting in capacitive cross-coupling between the first sensor and the layer, and wherein the layer comprises one or more apertures configured to reduce the capacitive cross-coupling; and
selecting the dimensions, positioning and/or shape of the one or more apertures to reduce the capacitive cross-coupling, such that the capacitive cross-coupling causes a negligible variation in the capacitance of the first sensor.

18. An apparatus comprising:
a capacitive touch sensor configured to detect a touch input from a stylus when said stylus is in proximity to the capacitive touch sensor; and an electrotactile layer configured to provide haptic feedback to a stylus when said stylus is in proximity to the electrotactile layer, wherein the capacitive touch sensor is configured to detect a touch input when the sensor is in an on state but not in an off state, and the electrotactile layer is configured to provide haptic feedback when the electrotactile layer is in an on state but not in an off state, wherein the apparatus is configured to place the capacitive touch sensor or electrotactile layer in the on state to provide for the respective touch input detection or haptic feedback only when the other of the electrotactile layer or capacitive touch sensor is in the off state;

wherein the dimensions, positioning and/or shape of the one or more apertures are chosen to reduce the capacitive cross-coupling, such that the capacitive cross-coupling causes a negligible variation in the capacitance of the first sensor.

* * * * *